United States Patent [19]

Davis et al.

[11] 4,035,452
[45] July 12, 1977

[54] METHOD OF MAKING NUCLEAR FUEL BODIES

[75] Inventors: Dwight E. Davis, Escondido; David F. Leary, San Diego, both of Calif.

[73] Assignee: General Atomic Company, San Diego, Calif.

[21] Appl. No.: 542,714

[22] Filed: Jan. 21, 1975

[51] Int. Cl.² ..................................... G21C 21/02
[52] U.S. Cl. ........................... 264/.5; 252/301.1 R
[58] Field of Search ................ 264/.5; 252/301.1 R

[56] References Cited

U.S. PATENT DOCUMENTS

| | | | |
|---|---|---|---|
| 3,236,921 | 2/1966 | Sermon | 264/.5 |
| 3,321,560 | 5/1967 | Wilkinson | 264/.5 |
| 3,342,910 | 9/1967 | Ishiharu et al. | 264/.5 |
| 3,492,379 | 1/1970 | Redding | 264/.5 |
| 3,644,604 | 2/1972 | Hooker | 264/.5 |

Primary Examiner—Samuel W. Engle
Assistant Examiner—David Leland
Attorney, Agent, or Firm—Fitch, Even, Tabin & Luedeka

[57] ABSTRACT

Particulate graphite having a particle size not greater than about 1500 microns is impregnated with a polymerizeable organic compound in liquid form. The impregnated particles are treated with a hot aqueous acid solution to at least begin the polymerization reaction and remove excess impregnant from the outer surface thereof. The treated particles are heated to complete the polymerization and then blended with particulate nuclear fuel. A nuclear fuel body is formed by joining the blend into a cohesive mass using a carbonaceous binder.

9 Claims, No Drawings

METHOD OF MAKING NUCLEAR FUEL BODIES

BACKGROUND OF THE INVENTION

This invention relates to the production of nuclear fuel bodies and more particularly to the production of nuclear fuel bodies which are molded from a mixture of pyrolytic carbon-coated fuel particles, graphite, and a suitable binder, such as pitch or the like.

Nuclear fuel bodies for nuclear reactors, for example high-temperature gas-cooled reactors, have a relatively large core area dnd thus require relatively large variations of the fissile and fertile loadings of fuel bodies to be disposed at different regions within the core. To economically produce fuel for reactors of this type, it is considered necessary to be able to produce fuel bodies of uniform dimensions which, in some simple fashion, will accommodate the relatively large variations of the fuel loading requirements.

One way in which this object has been accomplished has been by employing an inert filler or "shim", usually in the form of particles of graphite of a size generally approximating the size of the fuel particles, and by mixing the particulate graphite in varying amounts with the coated nuclear fuel particles to produce the fuel loading desired for a particular nuclear fuel body. The use of graphite particles in fuel bodies is considered to insure high-temperature and irradiation stability and to provide improved thermal conductivity. Moreover, it does not adversely affect the neutron economics of the core because graphite actually adds to the inventory of moderator in a reactor wherein the fuel elements themselves are made from a carbon moderating material, for example, blocks of graphite.

It has been found that two of the important properties of such shim graphite, for the purpose of insuring reproducible and uniform fuel body fabrication, are its strength and its apparent density or degree of porosity. The particulate graphite should have adequate strength to minimize compaction under the pressures which are normally necessary in molding green fuel bodies, and it is desired that particulate graphite be available having uniformly good structural strength and low porosity.

SUMMARY OF INVENTION

It has been found that improved fuel bodies can be made by employing graphite which has been first suitably treated in a manner to increase its strength and to decrease its porosity, without destroying its handling characteristics as a particulate material and without sacrificing any other desirable characteristics. Basically, the invention comprises providing particulate graphite in the desired size range, impregnating that graphite with a suitable thermosetting resin and then treating the impregnated particles to remove any resin from the outer surface of the particles prior to curing, so as to retain the free-flowing characteristics of the graphite particles after curing of the thermosetting resin.

DESCRIPTION OF THE PREFERRED EMBODIMENTS

Fuel elements of this general type may take any suitable size and shape, and one fuel element design for a high-temperature gas-cooled reactor employs a large block of graphite containing a multitude of parallel holes, some of which serve as fuel chambers and others of which serve as coolant passageways. Although the fuel chambers might have any shape, they are generally circular in cross section to facilitate fabrication, and they are fueled with nuclear fuel bodies in the form of cylinders of circular cross section and appropriate length having the desired fuel loading. The preferred designs employ coated nuclear fuel particles ranging between about 500 and about 1000 microns in size.

Graphite for the shim material is chosen which is preferably nearly isotropic and which has a density in the range of about 1.8 to about 2.0 $g/cm^3$. This graphite is sold by numerous manufacturers generally as reactor-grade graphite. The graphite is suitably crushed under conditions to produce particles in this desired size range, usually not greater than about 1500 microns and not less than about 300 microns. Any suitable crushing and sieving methods can be employed.

A suitable thermosetting organic resin is used which can be cured or polymerized usually as a result of heating. The resin is employed in a liquid form where it has a viscosity such that the liquid will penetrate into the pores of the graphite particles in a reasonable time. Some suitable resins in monomeric form having sufficiently low viscosity may be used in this fashion. Generally, a resin is used which has a sufficiently low viscosity, e.g., not greater than about 1000 centipoise at room temperature, so that a solvent is not needed. Examples of preferred impregnants include the various furan resins, such as furfuryl alcohol, and resole-type phenolic resins. Depending upon the impregnant used, it may be desirable to include a minor amount of a suitable catalyst, preferably an organic catalyst, which will assist in completing the polymerization reaction. For example, if furfuryl alcohol is used, a dicarboxylic acid or anhydride, e.g., maleic anhydride, may be used as a catalyst.

Following impregnation with the liquid resin, the particles are treated in a hot aqueous solution containing a small amount, e.g., a one to ten percent solution, of a mineral acid, such as hydrochloric acid or sulfuric acid. The temperature is maintained at at least about 80° C. and is usually maintained just below boiling, i.e., about 92° C. to 98° C. Agitation of the impregnated particles in the aqueous acid solution is maintained for about an hour or two. Treatment in this manner has been found to both pre-cure the resin within the pores of the graphite particles and remove substantially all of the excess resin which originally coated the surface of the graphite particles. This excess resin on the particle surfaces would otherwise cause the particulate graphite to bond together, thus destroying its free-flowing character and requiring a subsequent crushing operation to produce the particulate characteristics desired for fuel body fabrication (and such crushing would reduce the ultimate yield because of the inherent creation of additional fines). Moreover, the presence of carbon from the resin on the surface of the shim material may result in a reduction in the irradiation stability of the ultimate fuel rod as well as in the thermal conductivity thereof.

After suitably rinsing the treated particles with fresh water, the final curing of the impregnant is carried out for a time at a temperature commensurate with the thermosetting resin employed. For example, curing might be effected relatively slowly at a temperature of about 150° C. to 250° C. for from about 10 to 15 hours. Higher temperatures and shorter time periods can be employed to provide essentially the same time-temperature integral.

The resultant cured particles are substantially in free-flowing condition and whatever minor lumping might occur breaks up easily upon handling. The cured particles can be sifted through a coarse screen having openings of the desired maximum size without leaving any significant residue.

The free-flowing particulate graphite may be combined in batches with pyrolytic carbon-coated nuclear fuel particles, and both fertile and fissile fuel particles may be used. The shim graphite will usually be employed in an amount which will constitute between about 2 volume percent and about 40 volume percent of the total volume of the ultimate fuel body, and thus may constitute between about 5 weight percent and about 50 weight percent of the charge of shim plus fuel. For example, a batch of particulate material may be made for fabricating fuel bodies having a predetermined amount of fuel loading for one location in a nuclear reactor core by blending 48 parts by weight of graphite with 4 parts by weight of fissile fuel particles and 48 parts by weight of fertile fuel particles, whereas, another batch may be made for fabricating fuel bodies of a different fuel loading by blending 9 parts by weight of graphite with 3 parts of fissile particles and 88 parts of fertile particles.

One method of forming the green fuel bodies includes first filling a mold or fuel chamber with the fuel particle-graphite blend and then injecting petroleum pitch or a like carbonizable binder, which has been heated to assure it is in a liquid condition of desired viscosity, into the interstices thereof to form the particles into a cohesive fuel body. Usually a pressure of at least about 65 atmospheres, for example, about 1200 p.s.i. (80 atm.), is used.

Another method of preparing green fuel bodies comprises mixing the batch of uniformly blended particulate material with an appropriate amount of petroleum or coal tar pitch or a like carbonizable binder that has been ground to appropriate size, e.g., 500 to 1000 microns, to permit uniform distribution. The mixture of pitch, fuel particles and shim graphite is then fed into suitable molds of the desired size and shape to produce cylindrical objects. The mold is then heated to melt the pitch, and the heated mixture is compacted under pressure, e.g., about 80 atm., to form a fuel body of desired density.

After cooling, the green fuel bodies may be removed from the molds and then fired to carbonize the binder by driving off the volatiles and produce the resultant fuel body. Firing may be carried out in the fuel chambers of the fuel elements themselves or elsewhere, and it is effected by heating to a sufficient temperature under an inert atmosphere for a time period which assures the carbonization of the pitch or other binder material, viz, the pitch decomposes with the volatile matter being driven off and leaving a residue which is substantially entirely carbon.

The fuel bodies have acceptable strength and irradiation stability. As a result of the employment of the strong, impregnated, particulate graphite, it has been found that fuel bodies can be uniformly fabricated within precise tolerances in physical dimension and also in fuel loading. The strength of the impregnated particulate graphite resists crushing even if high pressures are employed to insure complete filling of the mold in making the green fuel bodies; whereas previously, the inherent character of the graphite shim material produced variations in the resultant nuclear fuel bodies. Although it is inherently difficult to treat small particles of a size in the range between about 1000 and 500 microns, the present process provides an effective and efficient method for endowing such particles with excellent strength, high density and free-flowing characteristics.

The following Example sets forth the best mode presently contemplated by the inventors for carrying out the invention; however, it should be understood that the Example in no way limits the invention, the scope of which is set forth in the claims appended hereto.

EXAMPLE

Nearly isotropic, fuel element-grade graphite (Great Lakes Carbon No. 1099) in an amount of 250 grams is crushed in a manner to produce particles having an average size of about 800 microns and is sieved to eliminate any particles below about 600 microns and any above about 1200 microns. The crushed graphite is disposed in a stainless steel beaker which is then placed in a vacuum chamber. A vacuum is established, and the pressure is lowered to less than 200 microns of mercury and maintained at this level for about 2 hours in order to out-gas the particulate graphite.

Furfuryl alcohol monomers containing about 5 weight percent of maleic anhydride (a catalyst) dissolved therein is admitted into the beaker in a sufficient quantity to cover all of the particulate graphite. The vacuum is then relieved, and a pressure of about 4 atmospheres of air is established and maintained for about 2 hours, at the end of which time the impregnation is considered to be complete. The pressure is released, and the beaker and its contents are removed from the vacuum chamber.

The impregnated graphite particles are separated from the excess of furfuryl alcohol resin by draining on a screen having sufficiently small openings, which screen may be supported on a funnel or the like to recover the excess resin being removed. After drainage is complete, the impregnated particles are slowly introduced into a strongly agitated aqueous solution of about 2 percent hydrochloric acid, maintained at a temperature of about 95° C. The temperature is held at this level, and agitation is continued for about 1 or 2 hours, during which time the resin within the pores of the graphite is pre-cured while that on the outer surface is removed. After the 2-hour treatment is concluded, the particle-containing solution is allowed to cool, and the acid solution discarded. The graphite particles are then rinsed a number of times with quantities of fresh water and, after draining, are placed in a circulating air oven to dry and complete the polymerization of the furfuryl alcohol impregnant. The maleic anhydride serves as a catalyst to promote the polymerization reaction, and because it is also an organic compound, it is ultimately carbonized, usually within the fuel element where carbonization of the fuel body generally takes place. Curing is usually completed by maintaining the oven at about 200° C. overnight.

At the conclusion of this time, the graphite particles are allowed to cool and are inspected. They are found to be essentially free-flowing, and any incidental bonding which may have occurred between adjacent particles is so weak as to crumble when pressed between the fingers. The particles all pass through a screen having openings of about 1200 microns, and the shim material is considered ready for the fabrication of nuclear fuel bodies. The density of the graphite, which was originally about 1.85 g/cm³, is now increased to about 1.95 g/cm³.

The particulate graphite in an amount of about 7 parts by weight is then blended with about 3 parts of pyrocarbon-coated enriched uranium carbide fuel particles having an average outer diameter of about 500 microns and about 9 parts of pyrocarbon-coated fertile thorium carbide particles about 800 microns in size. Stainless steel molds having a cavity about 15.7 mm. in diameter and about 65 mm. long are appropriately filled with this blend.

A binder in the form of petroleum pitch plus graphite flour is heated to a temperature of about 175° C. to reduce its viscosity and is injected under about 80 atmospheres pressure into the interstices of the particulate mixture in the mold. A number of green fuel bodies are produced in this manner, and they are allowed to cool to room temperature and solidify and are then removed from the molds. The green fuel bodies are fired in individual porous graphite tubes by heating to about 1800° C. over a period of about 2½ hours.

Examination of the fired nuclear fuel bodies shows that they have exceptional uniformity both in mass, in exterior dimensions, and in nuclear fuel loading. Testing of the bodies under simulated reactor core conditions shows that they exhibit excellent resistance to irradiation damage and are considered to be well suited for use in high temperature nuclear reactors. The characteristics of the impregnated particulate graphite render it excellently adaptable for blending with pyrocarbon-coated nuclear fuel particles to produce uniform batches of nuclear fuel material and shim material in order to fabricate carbonaceous nuclear fuel bodies of substantially any desired nuclear fuel loading.

Although the invention has been described with respect to certain preferred embodiments, it should be understood that modifications as would be obvious to one having the ordinary skill of this art may be made without departing from the scope of the invention which is set forth in the appended claims. Various of the features of the invention are set forth in the claims which follow.

What is claimed is:

1. A method of making nuclear fuel bodies which method comprises
    providing particulate graphite having a particle size not greater than about 1500 microns,
    impregnating said graphite with a polymerizable organic resin in liquid form,
    treating said impregnated particles with a hot aqueous acid solution to pre-cure said impregnated resin and to remove excess resin from the surfaces of said graphite particles,
    heating said treated particles to polymerize said impregnant,
    blending said impregnated particles with particulate nuclear fuel and
    forming a nuclear fuel body by joining said blend of particles into a cohesive mass using a carbonaceous binder.

2. A method in accordance with claim 1 wherein said impregnant is a mixture of furfuryl alcohol and a dicarboxylic acid or anhydride thereof.

3. A method in accordance with claim 2 wherein maleic anhydride is employed.

4. A method in accordance with claim 3 wherein said treating is carried out using hydrochloric acid at a temperature of at least about 80° C.

5. A method in accordance with claim 4 wherein said treated particles constitute at least about 2 volume percent of said fuel body.

6. A method in accordance with claim 1 wherein said particulate blend plus said binder is subjected to a pressure of at least about 65 atmospheres in said fuel body formation.

7. A method in accordance with claim 6 wherein a combination of said particulate blend and said binder is formed, placed in a mold and subjected to heat and compression to form said fuel body.

8. A method in accordance with claim 1 wherein said nuclear fuel particles have exterior coatings of pyrolytic carbon.

9. A method in accordance with claim 1 wherein said impregnant is a resole-type phenolic resin having a viscosity not greater than about 1000 centipoise at room temperature.

* * * * *